US006205705B1

United States Patent
Moodie

(10) Patent No.: US 6,205,705 B1
(45) Date of Patent: Mar. 27, 2001

(54) PLANT PROTECTIVE COVER SYSTEM

(76) Inventor: Henroy S. Moodie, 35A Houston Rd. Forest Hill, London SE23 2RJ (GB)

( * ) Notice: Subject to any disclaimer, the term of this patent is extended or adjusted under 35 U.S.C. 154(b) by 0 days.

(21) Appl. No.: 09/345,849

(22) Filed: Jul. 1, 1999

(51) Int. Cl.[7] ................................................ A01G 13/04
(52) U.S. Cl. ........................................................... 47/29
(58) Field of Search .................. 47/26, 28.1, 29, 47/30, 31, 32, 32.1; A01G 13/04

(56) References Cited

U.S. PATENT DOCUMENTS

| 757,045 | * | 4/1904 | Lane . | |
|---|---|---|---|---|
| 1,930,939 | * | 10/1933 | Horner . | |
| 4,137,667 | * | 2/1979 | Wallace et al. | 47/26 |
| 4,160,340 | * | 7/1979 | Levett | 47/27 |
| 4,286,408 | * | 9/1981 | Manno | 47/27 |
| 5,815,991 | * | 10/1998 | de Ridder | 47/29 X |

FOREIGN PATENT DOCUMENTS

| 3141485 A1 | * | 5/1983 | (DE) . |
| 3136404 A1 | * | 6/1983 | (DE) . |
| 2570925 A2 | * | 4/1986 | (FR) . |
| 2087703 | * | 6/1982 | (GB) . |

* cited by examiner

Primary Examiner—Michael J. Carone
Assistant Examiner—Jeffrey L. Gellner

(57) ABSTRACT

A plant protective cover system for protecting and insulating plants from cold weather. The plant protective cover system includes a ground sheet having a plurality of plant holes therethrough. An inner cover with an open bottom is rested on the ground sheet so that the open bottom of the inner cover is positioned over the plant holes of the ground sheet. An outer cover with has an open bottom is rested on the upper face of the ground sheet with the inner cover is upwardly extended into the open bottom of the outer cover so that the inner cover is enclosed by the outer cover. The inner cover is spaced apart from the outer cover to define an insulating space therebetween.

9 Claims, 2 Drawing Sheets

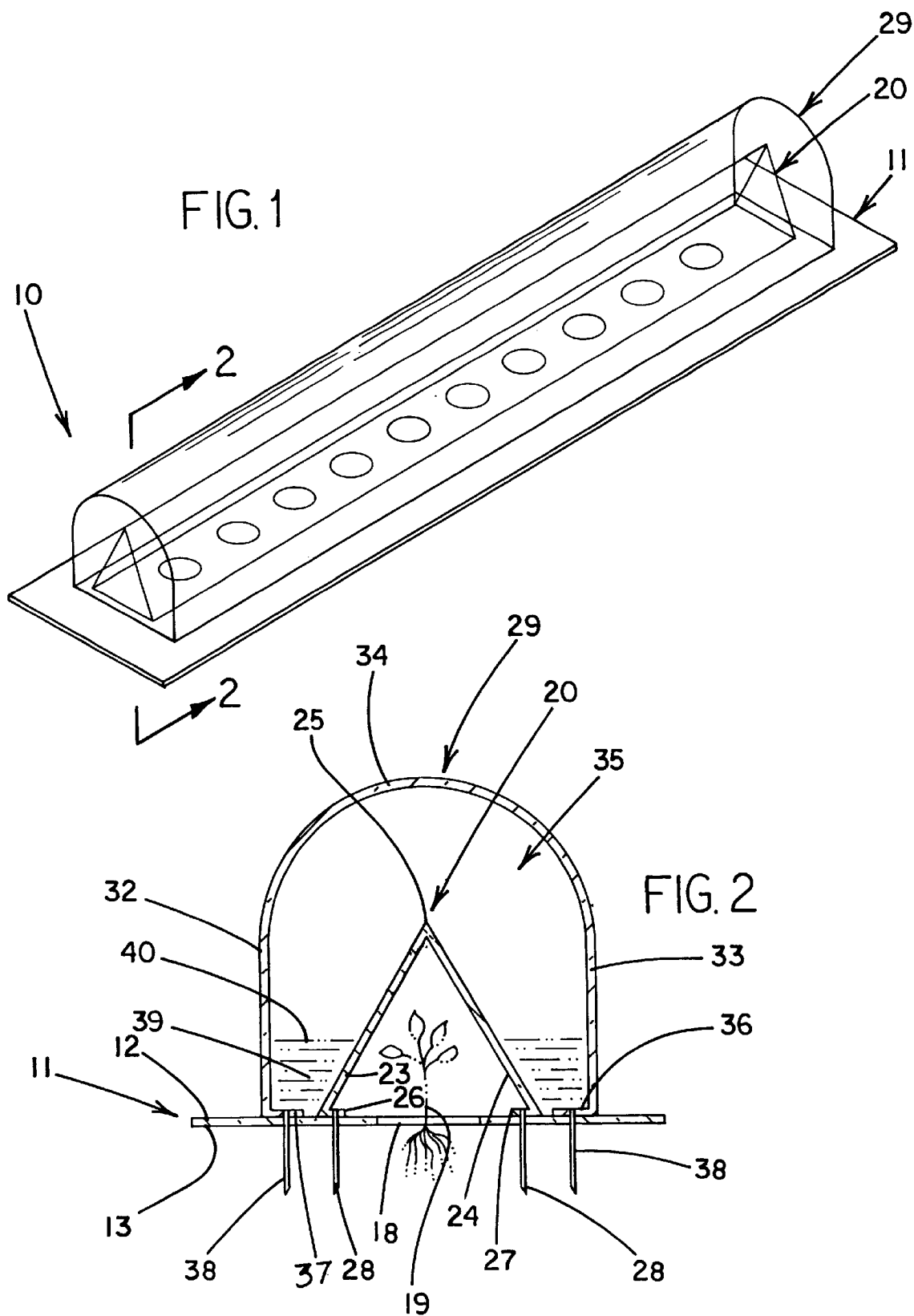

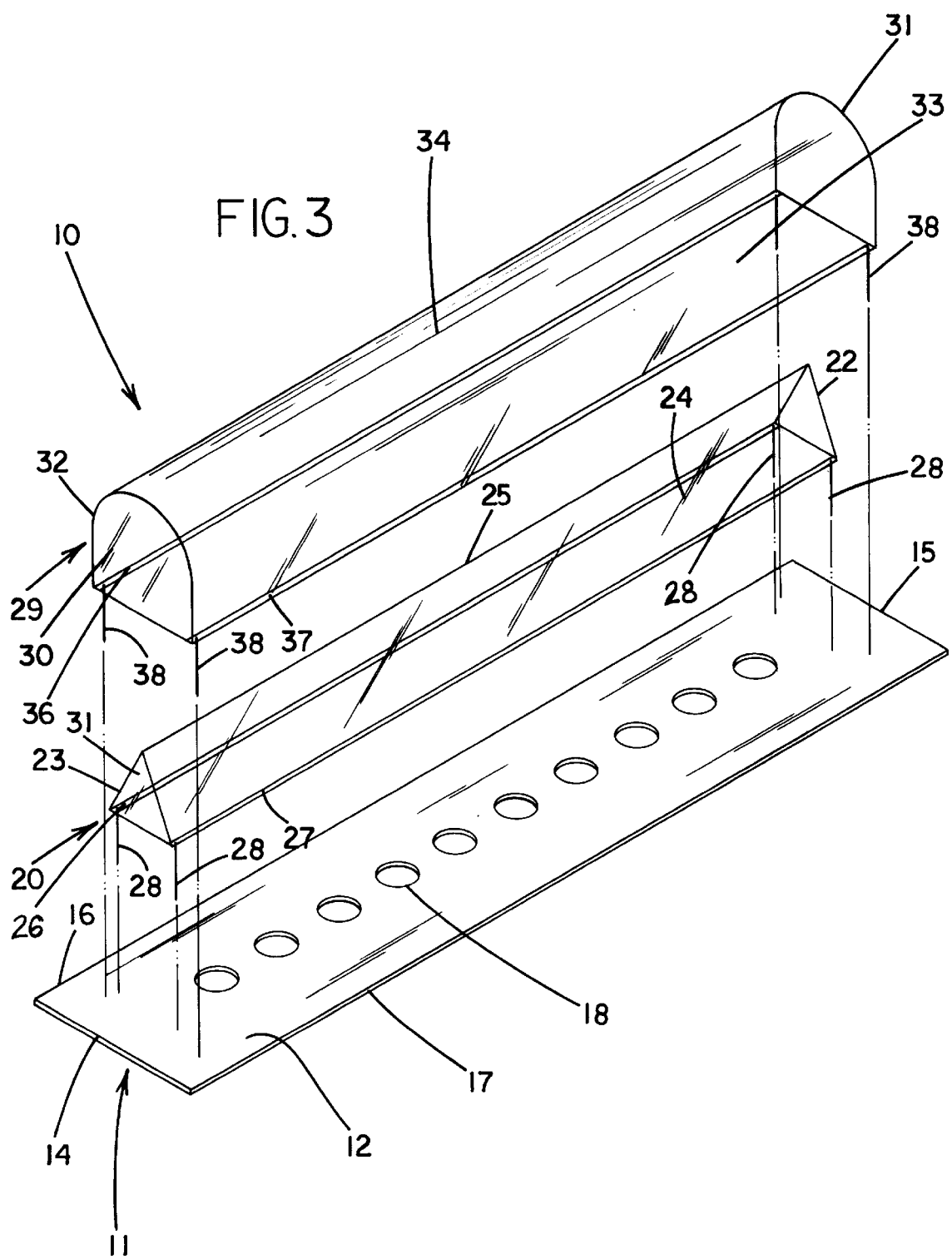

PLANT PROTECTIVE COVER SYSTEM

BACKGROUND OF THE INVENTION

1. Field of the Invention

The present invention relates to protective cover systems for plants and more particularly pertains to a new plant protective cover system for protecting and insulating plants from cold weather.

2. Description of the Prior Art

The use of protective cover systems for plants is known in the prior art. More specifically, protective cover systems for plants heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 2,832,178; U.S. Pat. No. 2,626,483; U.S. Pat. No. 2,326,548; U.S. Pat. No. 3,727,345; U.S. Pat. No. 3,698,131; and U.S. Pat. No. Des. 386,653.

While these devices fulfill their respective, particular objectives and requirements, the aforementioned patents do not disclose a new plant protective cover system. The inventive device includes a ground sheet having a plurality of plant holes therethrough. An inner cover with an open bottom is rested on the ground sheet so that the open bottom of the inner cover is positioned over the plant holes of the ground sheet. An outer cover with has an open bottom is rested on the upper face of the ground sheet with the inner cover is upwardly extended into the open bottom of the outer cover so that the inner cover is enclosed by the outer cover. The inner cover is spaced apart from the outer cover to define an insulating space therebetween.

In these respects, the plant protective cover system according to the present invention substantially departs from the conventional concepts and designs of the prior art, and in so doing provides an apparatus primarily developed for the purpose of protecting and insulating plants from cold weather.

SUMMARY OF THE INVENTION

In view of the foregoing disadvantages inherent in the known types of protective cover systems for plants now present in the prior art, the present invention provides a new plant protective cover system construction wherein the same can be utilized for protecting and insulating plants from cold weather.

The general purpose of the present invention, which will be described subsequently in greater detail, is to provide a new plant protective cover system apparatus and method which has many of the advantages of the protective cover systems for plants mentioned heretofore and many novel features that result in a new plant protective cover system which is not anticipated, rendered obvious, suggested, or even implied by any of the prior art protective cover systems for plants, either alone or in any combination thereof.

To attain this, the present invention generally comprises a ground sheet having a plurality of plant holes therethrough. An inner cover with an open bottom is rested on the ground sheet so that the open bottom of the inner cover is positioned over the plant holes of the ground sheet. An outer cover with has an open bottom is rested on the upper face of the ground sheet with the inner cover is upwardly extended into the open bottom of the outer cover so that the inner cover is enclosed by the outer cover. The inner cover is spaced apart from the outer cover to define an insulating space therebetween.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new plant protective cover system apparatus and method which has many of the advantages of the protective cover systems for plants mentioned heretofore and many novel features that result in a new plant protective cover system which is not anticipated, rendered obvious, suggested, or even implied by any of the prior art protective cover systems for plants, either alone or in any combination thereof.

It is another object of the present invention to provide a new plant protective cover system which may be easily and efficiently manufactured and marketed.

It is a further object of the present invention to provide a new plant protective cover system which is of a durable and reliable construction.

An even further object of the present invention is to provide a new plant protective cover system which is susceptible of a low cost of manufacture with regard to both materials and labor, and which accordingly is then susceptible of low prices of sale to the consuming public, thereby making such plant protective cover system economically available to the buying public.

Still yet another object of the present invention is to provide a new plant protective cover system which provides in the apparatuses and methods of the prior art some of the advantages thereof, while simultaneously overcoming some of the disadvantages normally associated therewith.

Still another object of the present invention is to provide a new plant protective cover system for protecting and insulating plants from cold weather.

Yet another object of the present invention is to provide a new plant protective cover system which includes a ground sheet having a plurality of plant holes therethrough. An inner cover with an open bottom is rested on the ground sheet so that the open bottom of the inner cover is positioned over the plant holes of the ground sheet. An outer cover with has an open bottom is rested on the upper face of the ground sheet with the inner cover is upwardly extended into the open bottom of the outer cover so that the inner cover is enclosed by the outer cover. The inner cover is spaced apart from the outer cover to define an insulating space therebetween.

Still yet another object of the present invention is to provide a new plant protective cover system that lets a user plant plants earlier in the season by protecting the seedlings from the cold and excessive precipitation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new plant protective cover system according to the present invention.

FIG. 2 is a schematic transverse cross sectional view of the present invention taken from line 2—2 of FIG. 1.

FIG. 3 is a schematic exploded perspective view of the present invention.

DESCRIPTION OF THE PREFERRED EMBODIMENT

With reference now to the drawings, and in particular to FIGS. 1 through 3 thereof, a new plant protective cover system embodying the principles and concepts of the present invention and generally designated by the reference numeral 10 will be described.

As best illustrated in FIGS. 1 through 3, the plant protective cover system 10 generally comprises a ground sheet having a plurality of plant holes therethrough. An inner cover with an open bottom is rested on the ground sheet so that the open bottom of the inner cover is positioned over the plant holes of the ground sheet. An outer cover with has an open bottom is rested on the upper face of the ground sheet with the inner cover is upwardly extended into the open bottom of the outer cover so that the inner cover is enclosed by the outer cover. The inner cover is spaced apart from the outer cover to define an insulating space therebetween.

In closer detail, the plant protective cover system 10 comprises a generally rectangular flexible ground sheet 11 having generally rectangular upper and lower faces 12,13, a pair of substantially parallel ends 14,15 and a pair of substantially parallel sides 16,17 extending perpendicular to the ends of the ground sheet. The ground sheet preferably comprises a water-impermeable material for preventing passage of water through the ground sheet between the upper and lower faces of the ground sheet. In use, the ground sheet is designed for resting on a ground surface.

The ground sheet has a plurality of generally circular plant holes 18 extending therethrough between the upper and lower faces of the ground sheet. The plant holes of the ground sheet are arranged in a row extending between the ends of the ground sheet and substantially parallel to the sides of the ground sheet. Preferably, the plant holes of the ground sheet are spaced apart at substantially equal intervals in the row of plant holes. In use, the plant holes of the ground sheet each are designed for extending therethrough a plant 19 upwardly extending from the ground surface.

The system also includes a triangular prism shaped inner cover 20 having a generally triangular transverse cross section, a generally rectangular open bottom, a pair of generally triangular opposite end panels 21,22, and a pair of generally rectangular side panels 23,24 connected together along an upper vertex edge 25 of the inner cover extending between the end panels of the inner cover. The inner cover preferably comprises a translucent (and ideally, a transparent) material.

The inner cover is rested on the upper face of the ground sheet such that the open bottom of the inner cover is positioned over the row of plant holes of the ground sheet so that plants upwardly extending through the plant holes extend through the open bottom of the inner cover. Each end panel of the inner cover is positioned adjacent an associated end of the ground sheet, the side panels of the inner cover is extended substantially parallel to the sides of the ground sheet.

The sides panels of the inner cover each have an inwardly extending elongate inner flange 26,27 adjacent the open bottom of the inner cover. The inner flanges of the inner cover are extended between the end panels of the inner cover such that the inner flanges of the inner cover rest on the upper face of the ground sheet. Each of the inner flanges of the inner cover each has a plurality of spaced apart securing holes therethrough. Each of the securing holes of the inner flanges of the inner cover has an elongate stake 28 downwardly extended therethrough and through the ground sheet into the ground surface to secure the inner cover to the ground surface.

An outer cover 29 is also included having a generally inverted-U-shaped transverse cross section, a generally rectangular open bottom, a pair of opposite end walls 30,31, a spaced apart pair of substantially parallel side walls 32,33 extending between the end walls of the outer cover, and an arcuate upper wall 34 extending between the end walls of the outer cover and connecting the side walls of the outer cover together. Like the inner cover, the outer cover comprises a translucent (and ideally, a transparent) material.

The outer cover is rested on the upper face of the ground sheet such that the inner cover is upwardly extending into the open bottom of the outer cover and enclosed by the outer cover. Each end panel of the inner cover is positioned towards an associated end wall of the outer cover and the side panels of the inner cover are extended substantially parallel to the side walls of the outer cover.

The inner cover is spaced apart from the outer cover to define an insulating space 35 therebetween. In particular, the end panels of the inner cover are spaced apart the end walls of the outer cover, the side panels of the inner cover are spaced apart the side walls of the outer cover, and the upper vertex edge is spaced apart from the arcuate upper wall of the outer cover. Preferably, the inner cover is equally spaced between both of the side walls of the outer cover. Ideally, the space between the inner cover and each side wall of the outer cover is about 3 inches to provide an optimal insulating space between the side panels and the side walls to provide optimal insulation to the plants in the inner cover.

The sides walls of the outer cover each have an inwardly extending elongate side flange 36,37 adjacent the open bottom of the outer cover. The side flanges of the outer cover is extended between the end walls of the outer cover such that the side flanges of the outer cover rest on the upper face of the ground sheet. Each of the side flanges of the outer cover each has a plurality of spaced apart securing holes therethrough. Each of the securing holes of the side flanges of the outer cover has an elongate stake 38 downwardly extended therethrough and through the ground sheet into the ground surface to secure the outer cover to the ground surface.

Preferably, an insulating material 39 such as, for example, manure, moss or compost, is provided in the insulating space and resting on an adjacent portion of the ground sheet beneath the insulating space. The inner cover has an upper portion upwardly extending from an upper surface 40 of the insulating material such that the upper portion of the inner cover is visible in the insulating space to permit light to shine on to the plants.

Ideally, the outer cover has a width defined between the side walls of the outer cover adjacent the open bottom of the outer cover of about 17 inches and a height defined between the open bottom and an apex of the arcuate upper wall of the outer cover of about 24 inches. In this ideal embodiment, the inner cover has a width defined between the side panels of the inner cover adjacent the open bottom of the inner cover of about 11 inches and a height defined between the open bottom and an apex of the arcuate upper wall of the inner cover of about 18 inches. These dimensions of the inner and outer cover provide an optimal size for use with most seedlings and small plants while not enclosing too much space as to make any heating of the space or insulating too inefficient to protect the seedlings.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A plant protective cover system, comprising:
   a ground sheet having a plurality of plant holes therethrough;
   an inner cover having an open bottom, said inner cover being rested on said ground sheet such that said open bottom of said inner cover is positioned over said plant holes of said ground sheet;
   an outer cover having an open bottom, said outer cover being rested on said upper face of said ground sheet such that said inner cover is upwardly extending into said open bottom of said outer cover and enclosed by said outer cover; and
   said inner cover being spaced apart from said outer cover to define an insulating space therebetween.

2. The plant protective cover system of claim 1, wherein said plant holes of said ground sheet are arranged in a linear row.

3. The plant protective cover system of claim 1, wherein said inner cover has a pair of inwardly extending elongate inner flanges adjacent said open bottom of said inner cover, said inner flanges of said inner cover resting on said upper face of said ground sheet.

4. The plant protective cover system of claim 3, wherein each of said inner flanges of said inner cover has a plurality of spaced apart securing holes therethrough, and wherein each of said securing holes of said inner flanges of said inner cover has an elongate stake downwardly extended therethrough and through said ground sheet.

5. The plant protective cover system of claim 1, wherein said outer cover has a pair of inwardly extending elongate side flanges adjacent said open bottom of said outer cover, said side flanges of said outer cover resting on said upper face of said ground sheet.

6. The plant protective cover system of claim 5, wherein each of said side flanges of said outer cover has a plurality of spaced apart securing holes therethrough, wherein each of said securing holes of said side flanges of said outer cover has an elongate stake downwardly extended therethrough and through said ground sheet.

7. The plant protective cover system of claim 1, further comprising an insulating material provided in said insulating space and resting on an adjacent portion of said ground sheet beneath said insulating space.

8. The plant protective cover system of claim 7, wherein said inner cover having an upper portion upwardly extending from an upper surface of said insulating material.

9. A plant protective cover system, comprising:
   a generally rectangular flexible ground sheet having generally rectangular upper and lower faces, a pair of substantially parallel ends and a pair of substantially parallel sides extending perpendicular to said ends of said ground sheet;
   said ground sheet being adapted for resting on a ground surface;
   said ground sheet having a plurality of generally circular plant holes extending therethrough between said upper and lower faces of said ground sheet;
   said plant holes of said ground sheet being arranged in a row extending between said ends of said ground sheet and substantially parallel to said sides of said ground sheet;
   an inner cover having a generally triangular transverse cross section, a generally rectangular open bottom, a pair of generally triangular opposite end panels, and a pair of generally rectangular side panels connected together along an upper vertex edge of said inner cover extending between said end panels of said inner cover;
   said inner cover comprising a translucent material;
   said inner cover being rested on said upper face of said ground sheet such that said open bottom of said inner cover is positioned over said row of plant holes of said ground sheet;
   said sides panels of said inner cover each having an inwardly extending elongate inner flange adjacent said open bottom of said inner cover, said inner flanges of said inner cover being extended between said end panels of said inner cover such that said inner flanges of said inner cover rest on said upper face of said ground sheet;

each of said inner flanges of said inner cover each having a plurality of spaced apart securing holes therethrough;

each of said securing holes of said inner flanges of said inner cover having an elongate stake downwardly extended therethrough and through said ground sheet;

an outer cover having a generally inverted-U-shaped transverse cross section, a generally rectangular open bottom, a pair of opposite end walls, a spaced apart pair of substantially parallel side walls extending between said end walls of said outer cover, and an arcuate upper wall extending between said end walls of said outer cover and connecting said side walls of said outer cover together;

said outer cover comprising a translucent material;

said outer cover being rested on said upper face of said ground sheet such that said inner cover is upwardly extending into said open bottom of said outer cover and enclosed by said outer cover;

each end panel of said inner cover being positioned towards an associated end wall of said outer cover, said side panels of said inner cover being extended substantially parallel to said side walls of said outer cover;

said inner cover being spaced apart from said outer cover such that said end panels of said inner cover are spaced apart said end walls of said outer cover, said side panels of said inner cover are spaced apart said side walls of said outer cover, and said upper vertex edge is spaced apart from said arcuate upper wall of said outer cover;

said inner and outer covers defining an insulating space therebetween;

said sides walls of said outer cover each having an inwardly extending elongate side flange adjacent said open bottom of said outer cover, said side flanges of said outer cover being extended between said end walls of said outer cover such that said side flanges of said outer cover rest on said upper face of said ground sheet;

each of said side flanges of said outer cover each having a plurality of spaced apart securing holes therethrough;

each of said securing holes of said side flanges of said outer cover having an elongate stake downwardly extended therethrough and through said ground sheet;

an insulating material being provided in said insulating space and resting on an adjacent portion of said ground sheet beneath said insulating space; and said inner cover having an upper portion upwardly extending from an upper surface of said insulating material.

\* \* \* \* \*